(12) United States Patent
Niida et al.

(10) Patent No.: US 7,960,301 B2
(45) Date of Patent: *Jun. 14, 2011

(54) GLASS COMPOSITION

(75) Inventors: Haruki Niida, Tokyo (JP); Akihiro Koyama, Tokyo (JP); Yukihito Nagashima, Tokyo (JP); Satoshi Furusawa, Tokyo (JP)

(73) Assignee: AvanStrate Inc., Mie (JP)

( * ) Notice: Subject to any disclaimer, the term of this patent is extended or adjusted under 35 U.S.C. 154(b) by 148 days.

This patent is subject to a terminal disclaimer.

(21) Appl. No.: 11/990,354

(22) PCT Filed: Aug. 4, 2006

(86) PCT No.: PCT/JP2006/315536
§ 371 (c)(1),
(2), (4) Date: Jul. 1, 2008

(87) PCT Pub. No.: WO2007/020825
PCT Pub. Date: Feb. 22, 2007

(65) Prior Publication Data
US 2009/0143214 A1    Jun. 4, 2009

(30) Foreign Application Priority Data

Aug. 15, 2005  (JP) ................. 2005-235571

(51) Int. Cl.
*C03C 3/11*     (2006.01)
*C03C 3/091*   (2006.01)
(52) U.S. Cl. ............... 501/56; 501/66; 501/67
(58) Field of Classification Search .......... 501/56, 501/66, 67
See application file for complete search history.

(56) References Cited

U.S. PATENT DOCUMENTS

| | | | |
|---|---|---|---|
| 4,640,900 A * | 2/1987 | Kokubu et al. ........ | 501/67 |
| 6,680,266 B1 | 1/2004 | Peuchert et al. | |
| 6,777,359 B2 | 8/2004 | Yamashita et al. | |
| 2003/0121288 A1 | 7/2003 | Naka et al. | |
| 2005/0209084 A1 | 9/2005 | Takaya et al. | |
| 2008/0090717 A1 | 4/2008 | Nagashima et al. | |
| 2008/0206494 A1 | 8/2008 | Kurachi et al. | |
| 2009/0131238 A1 | 5/2009 | Kishimoto et al. | |

FOREIGN PATENT DOCUMENTS

| | | |
|---|---|---|
| JP | 60-141642 A | 7/1985 |
| JP | 10-025132 A | 1/1998 |
| JP | 10-120437 A | 5/1998 |
| JP | 2000-128572 A | 5/2000 |
| JP | 2002-201040 A | 7/2002 |
| JP | 2003-026442 A | 1/2003 |
| JP | 2005-089259 A | 4/2005 |
| JP | 2005-306719 A | 11/2005 |
| WO | WO 2006/064878 | 6/2006 |

OTHER PUBLICATIONS

Derwent Abstract 2003-375485 of JP 2002-201040 A and machine translation, Jul. 16, 2002.*
Derwent Abstract 2003-251687 of JP 2003-026442 A and machine translation, Jan. 29, 2003.*
Derwent Abstract 2005-309524 of JP 2005-089259 A and machine translation, Apr. 7, 2005.*
Derwent Abstract 1998-328273 of JP 10-120437 A and machine translation, May 12, 1998.*
Derwent Abstract 2006-446269 of WO 2006/064878 A1, Jun. 22, 2006.*
English Abstract of JP 2005-306719 A and machine translation, Nov. 4, 2005.*
The English translation of the International Preliminary Report on Patentability and the Written Opinion of the International Searching Authority, mailed Feb. 20, 2008.

* cited by examiner

*Primary Examiner* — Karl E Group
*Assistant Examiner* — Elizabeth A Bolden
(74) *Attorney, Agent, or Firm* — Hamre, Schumann, Mueller & Larson, P.C.

(57) ABSTRACT

A glass composition which is reduced in the amount of residual bubbles and is produced using smaller amounts of an environmentally unfriendly component such as arsenic oxide and antimony oxide. This glass composition comprises, in terms of mass %: 40-70% $SiO_2$; 5-20% $B_2O_3$; 10-25% $Al_2O_3$; 0-10% MgO; 0-20% CaO; 0-20% SrO; 0-10% BaO; 0.001-0.5% $Li_2O$; 0.01-0.5% $Na_2O$; 0.002-0.5% $K_2O$; and 0-1.0%, excluding 0%, Cl.

19 Claims, 3 Drawing Sheets

GLASS COMPOSITION

TECHNICAL FIELD

The present invention relates to a glass composition, particularly to alumino-borosilicate glass compositions.

In manufacturing processes of glass compositions, a process that removes residual bubbles in the glass composition is known as fining. A method of adding a fining agent to fine a glass melt is commonly known. Arsenic oxide, antimony oxide, and fluorides are some of the known examples of the fining agent. However, because these components are highly environmentally unfriendly, there is a social need to reduce the amount of these components used.

Alkali-free borosilicate glass compositions have been used as the glass compositions for the substrate of information display devices, particularly active-matrix liquid crystal display devices (LCD). A representative example of such alkali-free borosilicate glass is Code 7059 glass produced by Corning of the United States. The mobility of components such as aluminum, boron, and silicon in glass is limited by the large charge and hence the strong electrostatic binding. For this reason, the alkali-free borosilicate glass compositions are generally highly viscous, and this has made fining of the glass difficult.

To this date, various studies have been made to provide a method for producing glass compositions for use as the substrate of liquid crystal display devices, without using undesirable fining agents as represented by arsenic oxide.

JP 10(1998)-25132A discloses adding, as fining agents, sulfate in the $SO_3$ amount of 0.005 to 1.0 weight %, and chloride in the $Cl_2$ amount of 0.01 to 2.0 weight %, to the raw glass materials for obtaining alkali-free borosilicate glass compositions. This publication also discloses using $BaSO_4$ and $CaSO_4$ as the sulfate, and $BaCl_2$ and $CaCl_2$ as the chloride.

JP 60(1985)-141642A discloses glass with a small thermal expansion coefficient for photomasks and liquid crystal display devices. This glass is alumino-borosilicate glass containing MgO in the amount of 5.0 mass % or greater, and it tolerates the inclusion of no greater than 5.0 mass % of alkali metal oxide. This publication discloses using at least one compound selected from $As_2O_3$, $Sb_2O_3$, $(NH_4)_2SO_4$, NaCl, and fluorides, as a degassing agent (fining agent) for the glass with a small thermal expansion coefficient.

As environmentally friendly fining agents, JP 10(1998)-25132A discloses $BaCl_2$ and $CaCl_2$, and JP 60(1985)-141642A discloses NaCl.

However, studies by the inventors of the present invention found that chlorides of alkali earth metals such as $BaCl_2$ and $CaCl_2$ do not always provide large fining effects. Further, when the glass composition containing a large amount of Na with the use of NaCl as a fining agent is used for the glass substrate of a liquid crystal display device, sodium ions may dissolve out of the glass substrate and impair the performance of the liquid crystal element.

DISCLOSURE OF THE INVENTION

An object of the present invention is to provide a glass composition that contains a few bubbles and a suitable composition for information display devices represented by a liquid crystal display device. It is another object of the invention to provide a glass substrate for information display devices using the glass composition, and an information display device using the glass substrate for information display devices.

A glass composition according to the present invention contains, in mass %, 40 to 70% $SiO_2$, 5 to 20% $B_2O_3$, 10 to 25% $Al_2O_3$, 0 to 10% MgO, 0 to 20% CaO, 0 to 20% SrO, 0 to 10% BaO, 0.001 to 0.5% $Li_2O$, 0.01 to 0.5% $Na_2O$, 0.002 to 0.5% $K_2O$, and greater than 0% and no greater than 1.0% Cl.

In another aspect, the present invention provides a glass substrate for information display devices, which consists of the glass composition. In another aspect, the present invention provides an information display device including the glass substrate for information display devices.

Alkali metal oxides such as $Li_2O$, $Na_2O$, and $K_2O$ dissolve out of the glass and adversely affect other members. For this reason, alkali metal oxides have been excluded from the glass composition in applications as the glass substrate for liquid crystal display devices. However, trace amounts of alkali metal oxides greatly improve the glass fining effect. Considering this, in a glass composition of the present invention, trace amounts of $Li_2O$, $Na_2O$, and $K_2O$ are added, together with trace amounts of Cl.

With the present invention, a sufficient fining effect can be obtained in an alumino-borosilicate glass composition without using, or using only a limited amount of, highly environmentally unfriendly components as represented by arsenic oxide. The present invention provides ways to produce glass substrates for large information display devices readily at high yield and low cost, while avoiding the use of highly environmentally unfriendly components.

BEST MODE FOR CARRYING OUT THE INVENTION

Figure 1:
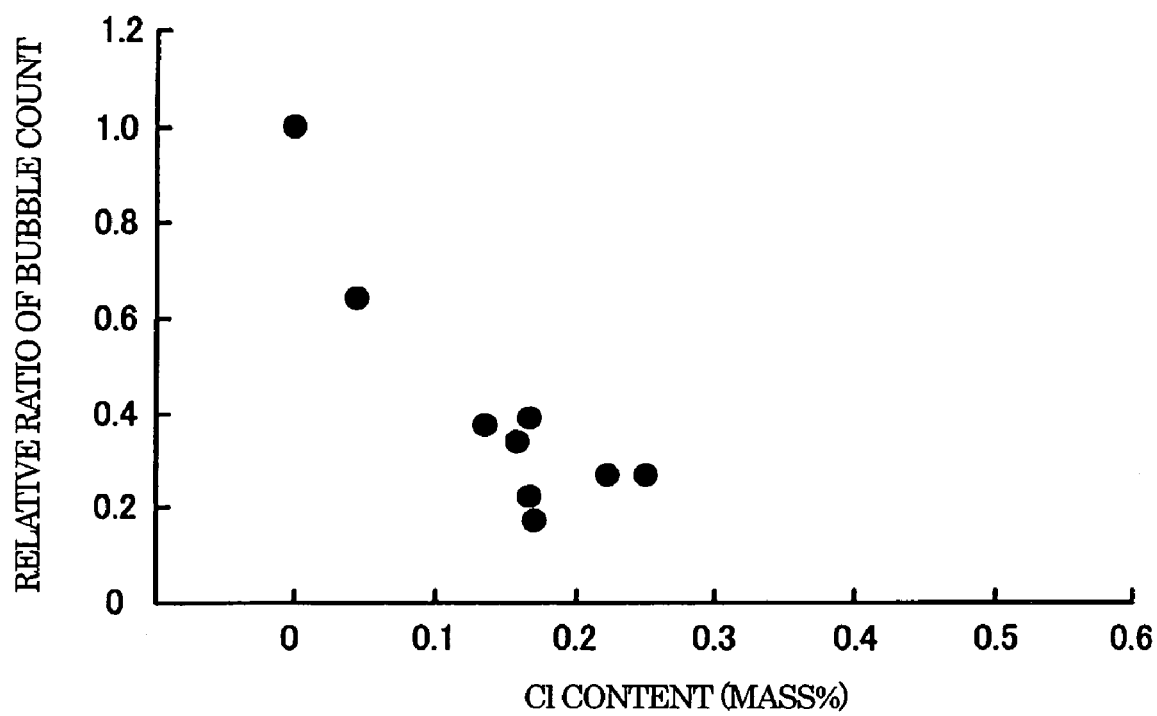
FIG. 1 is a graph representing a relationship between chlorine content and the number of residual bubbles in the glass compositions of Examples and Comparative Example 4 shown in Table 3.

A glass composition of the present invention contains chlorine, which makes it possible to obtain a glass composition containing a few bubbles readily. Preferably, chlorine is contained in the glass composition by melting a batch of raw glass material that has been prepared to include chloride, particularly alkali metal chloride and/or alkali earth metal chloride. In this way, chlorine effectively can exhibit its fining effect in the glass melt.

Though the mechanism of the fining action by chloride is not entirely clear, the inventors of the present invention have proposed the following explanation.

The boiling point of chloride, particularly alkali metal chloride is near the temperature range of, for example, 1400° C. to 1650° C. suited for the melting of a glass composition of the present invention. LiCl has a boiling point of 1360° C., and NaCl has a boiling point of 1413° C. The boiling point of KCl is 1510° C. That is, in a suitable melting temperature range of a glass composition of the present invention, the vapor pressures of these alkali metal chlorides are considered to increase to levels comparable to atmospheric pressure.

It is therefore possible that, in the process of melting a glass composition of the present invention, the chlorine would bind to the alkali in the glass melt and generate an alkali metal chloride gas. The alkali metal chloride gas forms bubbles in the glass melt, or increases the size of bubbles in the glass melt. These bubbles would then float to the surface of the glass melt and burst, with the result that the bubbles are removed from the glass melt. It is considered that the fining of the glass composition proceeds according to this mechanism.

Meanwhile, because Cl is volatile, the Cl content is often greater in the raw glass material than in the product glass. When the raw glass material contains a trace amount of Cl, hardly any Cl may remain in the product glass.

Alkali metal oxides such as $Li_2O$, $K_2O$, and $Na_2O$ dissolve out of the glass and adversely affect other members. For this reason, alkali metal oxides have been excluded from the glass composition in applications as the glass substrate for liquid crystal display devices. However, when the alkali metal oxides are used in trace amounts, the glass fining effect can be improved while suppressing the influence of dissolution from the glass at a level that would not cause any practical problem. These alkali metal oxides lower the viscosity of the glass and contribute to facilitating decomposition of silica, which does not easily decompose in the raw glass material.

The following will describe each component of the glass composition. In the following, the percentage denoting the content of each component of a glass composition is percent by mass.

($K_2O$, $Na_2O$, $Li_2O$)

$K_2O$, $Na_2O$, and $Li_2O$ are components that lower glass viscosity and facilitate fining of the glass. These components also facilitate decomposition of silica, which does not easily decompose in the raw glass material.

$K_2O$ binds to the chlorine ions in the glass melt and vaporizes in the form of potassium chloride at temperatures of 1500° C. or greater. This facilitates increasing the size of bubbles in the glass and causes the bubbles to float to the surface. By this float action, $K_2O$ also serves to homogenize the glass melt. When the $K_2O$ content is too high, there are cases where the thermal expansion coefficient of the glass is increased, which may produce a difference in the thermal expansion coefficient from silicone materials. The $K_2O$ content is therefore 0.002 to 0.5%. For example, the $K_2O$ content may be 0.005% or greater, greater than 0.01%, or in certain cases, greater than 0.03%. Further, the $K_2O$ content may be less than 0.05%.

As in the case of $K_2O$, $Na_2O$ and $Li_2O$ vaporize in the form of sodium chloride and lithium chloride, respectively, and increase the size of bubbles in the glass and cause the bubbles to float to the surface. At the same time, $Na_2O$ and $Li_2O$ also serve to homogenize the glass melt. Meanwhile, sodium easily dissolves out of the glass. The $Na_2O$ content is therefore 0.01 to 0.5%. The $Li_2O$ content is 0.001 to 0.5%. $Li_2O$ is a component that effectively lowers the volume resistivity of the glass composition. The $Li_2O$ content may be, for example, 0.002% or greater, greater than 0.01%, and in some cases, greater than 0.02%. Further, $Li_2O$ content may be 0.2% or less. The lower limit of $Na_2O$ is higher than those of $K_2O$ and $Li_2O$ because the use of industrial materials inevitably adds $Na_2O$ to the glass. The $Na_2O$ content may be, for example, greater than 0.04%, or greater than 0.05%. Further, the $Na_2O$ content may be 0.2% or less, or 0.1% or less.

The total content of $Li_2O$, $Na_2O$, and $K_2O$ may be greater than 0.06%, greater than 0.07%, or in certain cases, greater than 0.2%. The upper limit of the total content may be 1.5%, 1.0%, or in certain cases, 0.5%. In addition to $Li_2O$, $Na_2O$, and $K_2O$, the glass composition may include other alkali metal oxides such as $Rb_2O$ and $Cs_2O$. The total content of alkali metal oxides including $Rb_2O$ and/or $Cs_2O$ should preferably fall in the foregoing ranges, for example, in a range of greater than 0.06% to no greater than 1.5%.

By inclusion of $Li_2O$ and other alkali metal oxides such as $K_2O$ and $Na_2O$, a glass composition of the present invention can have lower volume resistivity compared with glass of the same composition except for these alkali metal oxides. Therefore, the product glass does not easily undergo electrification.

(Combined Alkaline Effect)

Among $Li_2O$, $K_2O$, and $Na_2O$, $K_2O$ has the slowest mobility rate in glass. By containing $K_2O$ in the glass composition with $Li_2O$ and/or $Na_2O$, the mobility rate of Li ions and/or Na ions can be suppressed. That is, by containing more than one kind of alkali metal oxide, chemical durability of the glass composition can be improved.

With more than one kind of alkali metal oxide used together in the glass composition, a superior fining effect can be obtained as compared with adding only one kind of alkali metal oxide. Further, with $Li_2O$, $Na_2O$, and $K_2O$ used together in trace amounts in the glass composition, dissolution of alkali metals or alkali metal ions from the glass composition can be suppressed and chemical durability of the glass composition can be improved. This is because, by using potassium having a large ion radius with sodium and lithium, the mobility of alkali metals or alkali metal ions is limited by the steric hinderance in the dense structure of the glass composition that has undergone volume shrinkage as a result of cooling from the molten state.

(Cl)

Cl is a component that can facilitate fining of the glass. The Cl content is in a range exceeding 0%. As will be described later in Examples, Cl can exhibit its fining effect even when contained in very trace amounts (for example, 0.001%). Meanwhile, since Cl does not readily decompose into the glass, condensation may occur in the glass being formed when the Cl content exceeds 1.0%. This may lead to formation of bubbles containing chloride crystals, or may encourage phase separation or devitrification of the glass. The Cl content is therefore greater than 0% and no greater than 1.0%. For example, the Cl content may be 0.002% or greater, 0.01% or greater, 0.04% or greater, greater than 0.09%, or in certain cases, greater than 0.1%.

The alkali metals as the constituting elements of $Li_2O$, $Na_2O$, and $K_2O$ may be supplied from different sources from the Cl source. However, the absolute fractions of these elements are so small that they compete with other ions for the binding reaction, with the result that the binding of these elements may not proceed sufficiently.

On the other hand, when lithium chloride (LiCl), potassium chloride (KCl), and sodium chloride (NaCl) are added to the raw materials, the alkali metals and Cl can exist as LiCl, KCl, and NaCl from an early stage of melting. This is advantageous for the fining because bubbles are formed rapidly when the glass temperature exceeds the boiling points of these alkali metal chlorides. It is therefore preferable that the raw materials of a glass composition of the present invention contain chlorides of alkali metals.

The alkali earth metal chlorides ($BaCl_2$, $CaCl_2$) used in JP 10(1998)-25132A have high boiling points and their mobility in glass is limited. Thus, these alkali earth metal chlorides do not tend to boil rapidly even when the temperature exceeds the boiling points. For this reason, sufficient fining effects may not be obtained from these alkali earth metal chlorides. On the other hand, alkali metal chlorides as represented by KCl can move more freely in the highly viscous molten glass such as the alumino-borosilicate glass, because alkali metal chlorides are monovalent salts and are subject to weak electric binding in the glass. Meanwhile, in a vacuum fining technique in which the glass melt is degassed under a reduced pressure atmosphere, a fining vessel is used that has a complex structure for sealing or other purposes. In this case, fining should be performed preferably in a lower temperature range (about 1450° C. to 1500° C.) than normal fining temperatures (1600° C. or greater). In this respect, the use of alkali metal chlorides, which can move more freely in molten glass, is particularly advantageous for vacuum fining.

Because Cl is volatile, the Cl content is often greater in the raw material than in the product glass. Thus, a greater amount of Cl source should be added, for example, to the batch of raw glass material than the Cl content needed for the glass composition.

($SiO_2$)

$SiO_2$ is an essential component as a glass network former, and it has the effect of enhancing chemical durability and heat resistance of the glass. This effect cannot be obtained sufficiently when the $SiO_2$ content is less than 40%. When the $SiO_2$ content exceeds 70%, the glass readily undergoes devitrification. This makes it difficult to form the glass, and the increased viscosity makes it difficult to homogenize the glass. Thus, the $SiO_2$ content should be 40 to 70%. For example, the $SiO_2$ content may be 58 to 70%, 57 to 65%, 60 to 65%, 56 to 65%, or 56 to 60%.

($B_2O_3$)

$B_2O_3$ is an essential component that lowers the viscosity of the glass and facilitates decomposition and fining of the glass. This effect cannot be obtained sufficiently when the $B_2O_3$ content is less than 5%. When the $B_2O_3$ content exceeds 20%, the acid resistance of the glass deteriorates and vaporization occurs rapidly, which makes it difficult to homogenize the glass. Thus, $B_2O_3$ content should be 5 to 20%. For example, the $B_2O_3$ content may be 8 to 13%, 5 to 12%, or 5 to 10%.

($Al_2O_3$)

$Al_2O_3$ is an essential component as a glass network former, and it has the effect of enhancing chemical durability and heat resistance of the glass. This effect cannot be obtained sufficiently when the $Al_2O_3$ content is less than 5%. When the $Al_2O_3$ content exceeds 25%, the viscosity of the glass lowers and acid resistance deteriorates. Thus, $Al_2O_3$ content should be 10 to 25%. For example, the $Al_2O_3$ content may be 13 to 20%, 10 to 20%, or 10 to 18%.

(MgO, CaO)

MgO and CaO are optional components that lower viscosity of the glass and facilitate decomposition and fining of the glass. When the MgO content and the CaO content exceed 10% and 20%, respectively, the chemical durability of the glass deteriorates. Thus, the MgO content should be 0 to 10%, and the CaO content should be 0 to 20%. For example, the MgO content may be 0 to 5%, or 5 to 10%. For example, the CaO content may be 0 to 10%, or 1 to 10%.

To improve the fining effect by Cl, both MgO and CaO preferably should be contained in the amount of at least 1%. In order to prevent glass devitrification, the MgO content preferably should be no greater than 5% and the CaO content preferably should be no greater than 6%. It is therefore preferable that the MgO content be 1 to 5%, and the CaO content 1 to 6%. More preferably, the MgO content is less than 5%.

(SrO, BaO)

SrO and BaO are optional components that lower viscosity of the glass and facilitate decomposition and fining of the glass. When the SrO content and the BaO content exceed 20% and 10%, respectively, the chemical durability of the glass deteriorates. Further, because of large ion radii, there are cases where SrO and BaO hinder mobility of potassium and chloride ions in the glass, which makes it difficult to fine the glass. Thus, the SrO content should be 0 to 20%, and the BaO content should be 0 to 10%. For example, the SrO content may be 0 to 4%, 0 to 10%, 1 to 10%, or 1 to 6%. For example, the BaO content may be 0 to 1%, or 3 to 10%.

A glass composition of the present invention may further contain other components for the purposes of controlling refractive index and temperature viscosity characteristics and preventing devitrification, for example. Specific examples of such additional components include ZnO, $Y_2O_3$, $La_2O_3$, $Ta_2O_5$, $Nb_2O_5$, $GeO_2$, $Ga_2O_5$, $SnO_2$, and $TiO_2$. These components may be contained in the total amount of at most 3%. In certain cases, addition of ZnO may not be preferable. Further, oxides of As or Sb may be contained, as will be described later. $Fe_2O_3$ also may be contained in a range of less than 0.5%. NiO may be contained in a range of less than 0.05%. CoO may be contained in a range of less than 0.01%. In certain cases, Mo may be contained in a range of less than 0.02%.

The glass composition may be a composition that essentially comprises the foregoing component groups (a group of components $K_2O$, $Na_2O$, $Li_2O$ to SrO, BaO individually described above, and a group of components ZnO to Mo given in the foregoing paragraph). In this case, the glass composition does not essentially include components other than these component groups.

As used herein, the language "does not essentially include" is intended to encompass inclusion of a trace amount of impurity that is inevitable in industrial manufacturing. Specifically, it is intended that a trace amount of impurity is contained in the amount of less than 0.05%, preferably less than 0.01%, and more preferably less than 0.001%.

With a glass composition of the present invention, the amount of arsenic oxide or antimony oxide used can be reduced while at the same time realizing desirable glass clarity. However, the present invention should not be understood to completely exclude As, Sb, or other highly environmentally unfriendly components. Though it is preferable that a glass composition of the present invention does not essentially contain oxides of arsenic and antimony, the present invention is not limited to this. As will be described later in Examples, a glass composition of the present invention may include oxides of arsenic and/or antimony. For example, oxides of arsenic may be contained in the $As_2O_3$ amount of greater than 0% to no greater than 0.1%. Oxides of antimony, not as environmentally unfriendly as arsenic, may be contained in the $Sb_2O_3$ amount of greater than 1.0%, or in the $Sb_2O_3$ amount of greater than 0% to less than 0.4%, as will be described later in Examples. By further adding $SnO_2$ and using it with arsenic oxide and/or antimony oxide, a superior fining effect can be obtained, as will be described later in Examples. The $SnO_2$ content may be, for example, greater than 0% and no greater than 3%. The upper limit of $SnO_2$ is preferably 2%, and more preferably 1%. The lower limit of $SnO_2$ is preferably 0.05%.

As to the content of each component $SiO_2$ to SrO, BaO described above, the content may be, for example, 58 to 70% $SiO_2$, 8 to 13% $B_2O_3$, 13 to 20% $Al_2O_3$, 1 to 5% MgO, 1 to 10% CaO, 0 to 4% SrO, and 0 to 1% BaO. Further, in these components, the content may be, for example, 57 to 65% $SiO_2$, 5 to 12% $B_2O_3$, 10 to 20% $Al_2O_3$, 5 to 10% MgO, 0 to 10% CaO, and 0 to 10% SrO. Further, in these components, the content may be, for example, 60 to 65% $SiO_2$, 5 to 12% $B_2O_3$, 10 to 20% $Al_2O_3$, 0 to 5% MgO, 1 to 6% CaO, 0 to 10% SrO, and 0 to 1% BaO. Further, in these components, the content may be, for example, 56 to 65% $SiO_2$, 5 to 12% $B_2O_3$, 10 to 18% $Al_2O_3$, 0 to 5% MgO, 1 to 10% CaO, 1 to 10% SrO, and 0 to 1% BaO. Further, in these components, the content may be, for example, 56 to 60% $SiO_2$, 5 to 12% $B_2O_3$, 10 to 18% $Al_2O_3$, 0 to 5% MgO, 1 to 6% CaO, 1 to 6% SrO, and 3 to 10% BaO.

A method for forming a glass composition of the present invention is not particularly limited. The downdraw process or fusion process may be used.

Figure 2:
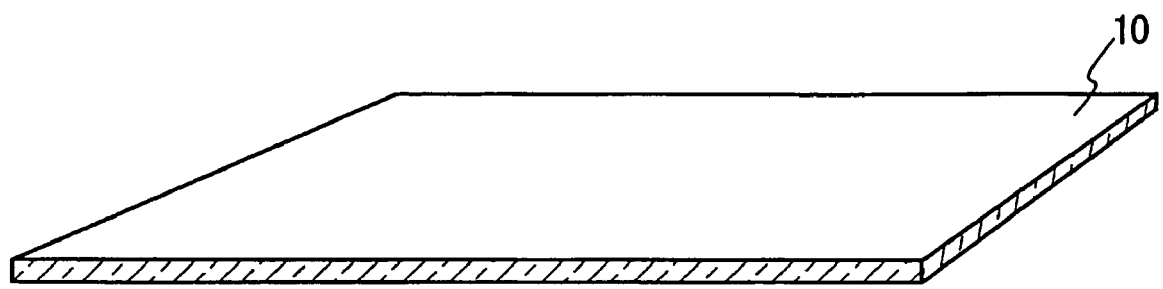
FIG. 2 is a perspective view showing an example of a glass substrate for information display devices, formed from a glass composition of the present invention.
Figure 3:
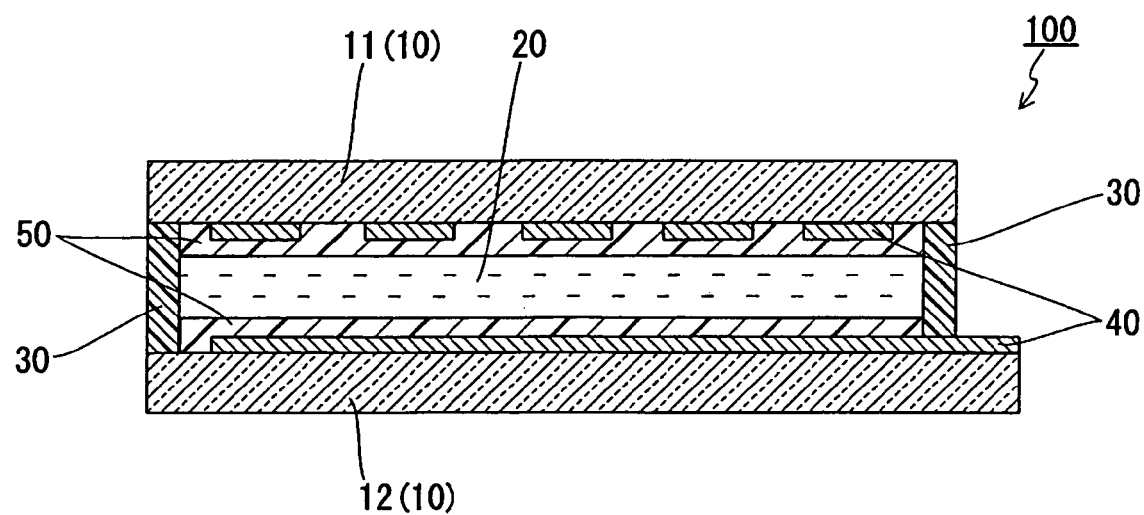
FIG. 3 is a cross sectional view of an information display device, showing an exemplary use of the glass substrate for information display devices of FIG. 2.

A glass composition of the present invention can be used suitably as a glass substrate 10 for large and thin information display devices such as a liquid crystal display device and a plasma display panel, as shown in FIG. 2. The glass substrate 10 may be used, for example, as a front panel 11 and a back panel 12 of a liquid crystal display device 100, illustrated in FIG. 3 as an example of an information display device. As shown in FIG. 3, the front panel 11 and the back panel 12 provided for the liquid crystal display device 100 are disposed on the both sides of a liquid crystal layer 20 with a sealant 30 in between, together with other members such as transparent electrodes 40 and alignment films 50.

The following will describe an embodiment of the present invention based on examples. It should be noted, however, that the present invention is not limited by the following description.

EXAMPLES 1 TO 58, COMPARATIVE EXAMPLES 1 TO 11

Batches of raw glass materials (may be referred to as "batches" hereinafter) were prepared to have the compositions shown in Tables 1 to 7. As common raw glass materials, silica (silicon oxide), boric anhydride, alumina, basic magnesium carbonate, calcium carbonate, strontium carbonate, barium carbonate, lithium carbonate, sodium carbonate, and potassium carbonate were used. As Cl sources, lithium chloride, sodium chloride, potassium chloride, and calcium chloride were used.

Each batch was melted and fined in a platinum crucible. The crucible was placed in an electric furnace that had been set at 1600° C., and maintained therein for 4 hours in Examples 1 to 44 and Comparative Examples 1 to 8, and 16 hours in Examples 45 to 58 to melt the batch. The crucible with the glass melt was taken out of the furnace and allowed to cool and solidify at room temperature. As a result, a glass body was obtained. The glass body was taken out of the crucible and gradually cooled. The cooling was performed according to the following procedure. In Examples 1 to 44 and Comparative Examples 1 to 8, the glass body was placed in a separate electric furnace that had been set at 700° C., and maintained therein for 1 hour. In Examples 45 to 58 and Comparative Examples 9 to 11, the glass body was placed in a separate electric furnace that had been set at 750° C., and maintained therein for 1 hour. The glass body was then allowed to cool to room temperature by turning off the electric furnace. The resulting glass body was used as a sample glass.

(Quantification of Glass Composition)

The sample glass was comminuted to quantify the glass composition by fluorescent x-ray analysis using RIX3001 from Rigaku Corporation. Note that boron (B) was quantified by emission spectral analysis using ICPS-1000IV of Shimadzu Corporation.

(Evaluation of Clarity)

The clarity of the glass body was evaluated through observation of the sample glass with an optical microscope (40×) and by finding the number of bubbles per 1 $cm^3$ of glass from thickness, view area, and the number of bubbles observed. Clarity was also evaluated by determining a relative ratio of bubble count with respect to the blank sample glasses.

Since this method is based on simple decomposition using a crucible, the bubble count is much greater than numbers of bubbles actually contained in a commercially produced glass body. Nevertheless, it is known that the number of bubbles contained in the commercially produced glass body will be small when the bubble count determined based on this method is small. It is therefore possible to use this method for the measurement of clarity evaluation.

(Evaluation of Homogeneity Due to Melting)

Homogeneity of each sample glass due to melting was visually evaluated. Homogeneity was evaluated as "Good" when undecomposed portions were not observed, and "Poor" when undecomposed portions were observed.

As shown in Tables 1 to 7, the sample glasses of Examples 1 to 58 all had good homogeneity due to melting. Further, the sample glasses of Examples 1 to 58 all had smaller relative ratios of bubble count and fewer numbers of bubbles compared with Comparative Examples that did not contain $Li_2O$, $Na_2O$, $K_2O$, and Cl. The number of residual bubbles in the sample glasses of Comparative Examples 1, 4, and 11 was about 1100/$cm^3$, about 340/$cm^3$, and about 450/$cm^3$, respectively. Undecomposed portions were observed in all of the sample glasses of Comparative Examples 1 to 8, but not in the sample glasses of Examples 1 to 58. This showed that the sample glasses of Examples 1 to 58 also had good homogeneity due to decomposition. In Comparative Examples 9 and 10, devitrification occurred during the gradual cooling of the glass melt to room temperature in a crucible that was taken out of the furnace in the preparation of the sample glass. As a result, the resulting glass body was not homogenous.

(Overall Evaluation)

The sample glasses of Examples 1 to 44 and Comparative Examples 1 to 8 shown in Tables 1 to 5 were evaluated comprehensively based on homogeneity and the relative ratio of bubble count. Specifically, the overall evaluation was made as follows: "Poor" when homogeneity was "Poor" and the relative ratio of bubble count was 1.0 or greater; "Acceptable" when homogeneity was "Good" and the relative ratio of bubble count was 0.7 or greater and less than 1.0; "Good" when homogeneity was "Good" and the relative ratio of bubble count was 0.5 or greater and less than 0.7; and "Excellent" when homogeneity was "Good" and the relative ratio of bubble count was less than 0.5. In Table 6, the relative ratio of bubble count is not given for the sample glasses of Examples 45 to 58 because the Comparative Examples did not have compositions similar to these Examples. However, the overall evaluation was "Excellent" because all of these Examples had small numbers of bubbles (20/$cm^3$ or less) and good homogeneity. The glass devitrified in the sample glasses of Comparative Examples 9 and 10 shown in Table 7, giving a poor mark in the overall evaluation without having the need to evaluate the bubble count. In the sample glass of Comparative Example 11 shown in Table 7, the overall evaluation was "Poor" because the bubble count (450/$cm^3$) was greater than that in Comparative Example 4.

FIG. 1 is a graph representing a relationship between the chlorine content and the relative ratio of bubble count in the sample glasses of Examples 15 to 22 and Comparative Example 4. As shown in the graph, the number of residual bubbles in the sample glass decreased with increase in chlorine content.

Taken together, a glass composition of the present invention enables manufacture of glass substrates that have very few defects due to residual bubbles or other deficiencies, without using, or using a reduced amount of, arsenic oxide and the like.

In the sample glasses of Examples 1 to 14 for example, the thermal expansion coefficient can be confined in a range of 30 to $50 \times 10^{-7}$/K, though not shown in Tables. This is considered to be due to the small amounts of $Li_2O$, $Na_2O$, and $K_2O$ added in the limited ranges shown in Tables. Further, in the sample glasses of Examples 1 to 14 for example, the glass transition point Tg can be increased to 720 to 750° C.

Further, in the sample glasses of Examples 45, 47, 50 to 53, and 55 to 58 for example, the devitrification temperature can be lowered to no greater than 1100° C., preferably no greater than 1000° C. Measurement of devitrification temperature was performed as follows.

First, the sample glass was comminuted with a mortar. Then, glass particles that passed a 2380 μm mesh sieve but did not pass a 1000 μm mesh sieve were collected from the comminuted sample glasses (glass particles). The glass particles so collected were subjected to ultrasonic washing in ethanol and dried to prepare a measurement sample. The measurement sample (25 g) was placed on a platinum board (12 mm in width, 200 mm in length) and put in a temperature gradient furnace where the measurement sample was held for 2 hours. The glass was taken out of the furnace and crystals that grew in the glass (devitrification) were observed with an optical microscope. A maximum temperature at which crystals were observed was given as a devitrification temperature.

TABLE 1

| Component (mass %) | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 64.6 | 64.6 | 64.6 | 64.6 | 64.5 | 64.5 | 64.4 | 64.1 |
| $B_2O_3$ | 9.0 | 9.0 | 9.0 | 9.0 | 9.0 | 9.0 | 9.0 | 9.0 |
| $Al_2O_3$ | 16.4 | 16.4 | 16.4 | 16.4 | 16.4 | 16.4 | 16.3 | 16.3 |
| MgO | 1.6 | 1.6 | 1.6 | 1.6 | 1.6 | 1.6 | 1.6 | 1.6 |
| CaO | 5.5 | 5.5 | 5.5 | 5.5 | 5.5 | 5.5 | 5.5 | 5.5 |
| SrO | 1.8 | 1.8 | 1.8 | 1.8 | 1.8 | 1.8 | 1.8 | 1.8 |
| BaO | — | — | — | — | — | — | — | — |
| $Li_2O$ | 0.490 | 0.492 | 0.489 | 0.483 | 0.492 | 0.483 | 0.482 | 0.479 |
| $K_2O$ | 0.046 | 0.045 | 0.042 | 0.046 | 0.040 | 0.041 | 0.046 | 0.047 |
| $Na_2O$ | 0.492 | 0.494 | 0.490 | 0.485 | 0.494 | 0.484 | 0.486 | 0.482 |
| Cl | 0.001 | 0.005 | 0.010 | 0.021 | 0.042 | 0.077 | 0.319 | 0.718 |
| Relative ratio of bubble count* | 0.96 | 0.83 | 0.71 | 0.54 | 0.37 | 0.25 | 0.07 | 0.03 |
| Homogeneity | Good | Good | Good | Good | Good | Good | Good | Good |
| Overall evaluation | Acceptable | Acceptable | Acceptable | Good | Excellent | Excellent | Excellent | Excellent |

*Comparison with Comparative Example 1

TABLE 2

| | Component (mass %) | | | | | | | | |
|---|---|---|---|---|---|---|---|---|---|
| | Ex. 9 | Ex. 10 | Ex. 11 | Ex. 12 | Ex. 13 | Ex. 14 | Comparative Example 1 | Comparative Example 2 | Comparative Example 3 |
| $SiO_2$ | 64.8 | 64.8 | 63.2 | 63.4 | 63.6 | 63.8 | 65.2 | 65.1 | 65.0 |
| $B_2O_3$ | 9.1 | 9.1 | 8.8 | 8.8 | 8.8 | 8.8 | 9.1 | 9.1 | 9.1 |
| $Al_2O_3$ | 16.5 | 16.4 | 16.0 | 16.0 | 16.0 | 16.1 | 16.6 | 16.5 | 16.5 |
| MgO | 1.7 | 1.7 | 1.6 | 1.6 | 1.6 | 1.6 | 1.7 | 1.7 | 1.6 |
| CaO | 5.6 | 5.5 | 5.4 | 5.4 | 5.4 | 5.4 | 5.6 | 5.6 | 5.5 |
| SrO | 1.8 | 1.8 | 1.8 | 1.8 | 1.8 | 1.8 | 1.8 | 1.8 | 1.8 |
| BaO | — | — | — | — | — | — | — | — | — |
| $Li_2O$ | 0.006 | 0.254 | 0.003 | 0.004 | 0.003 | 0.004 | — | 0.006 | 0.379 |
| $K_2O$ | 0.003 | 0.008 | 0.003 | 0.004 | 0.003 | 0.010 | — | 0.189 | 0.054 |
| $Na_2O$ | 0.417 | 0.149 | 0.368 | 0.362 | 0.067 | 0.057 | — | 0.003 | 0.004 |
| Cl | 0.197 | 0.312 | 0.172 | 0.172 | 0.031 | 0.027 | — | — | — |
| $SnO_2$ | — | — | 0.1 | — | 0.1 | — | — | — | — |
| $As_2O_3$ | — | — | 0.1 | — | 0.1 | — | — | — | — |
| $Sb_2O_3$ | — | — | 2.4 | 2.4 | 2.4 | 2.4 | — | — | — |
| Relative ratio of bubble count* | 0.11 | 0.07 | 0 | 0.03 | 0.01 | 0.04 | 1 | 0.13 | 0.15 |
| Homogeneity | Good | Good | Good | Good | Good | Good | Poor | Poor | Poor |
| Overall evaluation | Excellent | Excellent | Excellent | Excellent | Excellent | Excellent | Poor | Poor | Poor |

*Comparison with Comparative Example 1

TABLE 3

| | Component (mass %) | | | | | | | | | |
|---|---|---|---|---|---|---|---|---|---|---|
| | Ex. 15 | Ex. 16 | Ex. 17 | Ex. 18 | Ex. 19 | Ex. 20 | Ex. 21 | Ex. 22 | Comparative Example 4 | Comparative Example 5 | Comparative Example 6 |
| $SiO_2$ | 59.7 | 59.6 | 59.6 | 59.6 | 59.5 | 59.5 | 59.4 | 59.3 | 59.8 | 59.3 | 59.6 |
| $B_2O_3$ | 10.5 | 10.5 | 10.5 | 10.5 | 10.5 | 10.5 | 10.5 | 10.5 | 10.5 | 10.5 | 10.5 |
| $Al_2O_3$ | 15.1 | 15.1 | 15.1 | 15.1 | 15.0 | 15.1 | 15.0 | 15.0 | 15.1 | 15.0 | 15.1 |
| MgO | 0.5 | 0.5 | 0.5 | 0.5 | 0.5 | 0.5 | 0.5 | 0.5 | 0.5 | 0.5 | 0.5 |

TABLE 3-continued

| | Component (mass %) | | | | | | | | | | |
|---|---|---|---|---|---|---|---|---|---|---|---|
| | Ex. 15 | Ex. 16 | Ex. 17 | Ex. 18 | Ex. 19 | Ex. 20 | Ex. 21 | Ex. 22 | Comparative Example 4 | Comparative Example 5 | Comparative Example 6 |
| CaO | 4.7 | 4.7 | 4.7 | 4.7 | 4.6 | 4.6 | 4.6 | 4.7 | 4.7 | 4.6 | 4.7 |
| SrO | 3.1 | 3.1 | 3.1 | 3.1 | 3.1 | 3.1 | 3.1 | 3.1 | 3.1 | 3.1 | 3.1 |
| BaO | 6.2 | 6.2 | 6.2 | 6.2 | 6.2 | 6.2 | 6.2 | 6.1 | 6.2 | 6.1 | 6.2 |
| $Li_2O$ | 0.015 | 0.107 | 0.152 | 0.190 | 0.006 | 0.098 | 0.025 | 0.090 | — | 0.180 | 0.359 |
| $K_2O$ | 0.035 | 0.022 | 0.017 | 0.003 | 0.003 | 0.002 | 0.048 | 0.280 | — | 0.055 | 0.051 |
| $Na_2O$ | 0.045 | 0.059 | 0.020 | 0.051 | 0.417 | 0.234 | 0.402 | 0.180 | — | 0.559 | 0.003 |
| Cl | 0.045 | 0.135 | 0.159 | 0.167 | 0.167 | 0.171 | 0.222 | 0.250 | — | — | — |
| Relative ratio of bubble count* | 0.64 | 0.37 | 0.34 | 0.39 | 0.22 | 0.17 | 0.26 | 0.26 | 1 | 0.22 | 0.09 |
| Homogeneity | Good | Good | Good | Good | Good | Good | Good | Good | Poor | Poor | Poor |
| Overall evaluation | Good | Excellent | Excellent | Excellent | Excellent | Excellent | Excellent | Excellent | Poor | Poor | Poor |

*Comparison with Comparative Example 4

TABLE 4

| | Component (mass %) | | | | | | | | |
|---|---|---|---|---|---|---|---|---|---|
| | Ex. 23 | Ex. 24 | Ex. 25 | Ex. 26 | Ex. 27 | Ex. 28 | Ex. 29 | Ex. 30 | Comparative Example 7 |
| $SiO_2$ | 62.4 | 62.3 | 62.4 | 62.2 | 62.3 | 62.1 | 62.4 | 62.3 | 62.5 |
| $B_2O_3$ | 11.9 | 11.9 | 11.9 | 11.9 | 11.9 | 11.9 | 12.0 | 11.9 | 12.0 |
| $Al_2O_3$ | 15.2 | 15.2 | 15.2 | 15.1 | 15.2 | 15.1 | 15.2 | 15.2 | 15.2 |
| MgO | 2.0 | 2.0 | 2.0 | 2.0 | 2.0 | 2.0 | 2.0 | 2.0 | 2.0 |
| CaO | 3.0 | 2.9 | 3.0 | 2.9 | 3.0 | 2.9 | 3.0 | 3.0 | 3.0 |
| SrO | 3.7 | 3.7 | 3.7 | 3.7 | 3.7 | 3.7 | 3.7 | 3.7 | 3.8 |
| BaO | 1.5 | 1.5 | 1.5 | 1.5 | 1.5 | 1.5 | 1.5 | 1.5 | 1.5 |
| $Li_2O$ | 0.039 | 0.039 | 0.034 | 0.034 | 0.066 | 0.066 | 0.021 | 0.021 | 0.003 |
| $K_2O$ | 0.072 | 0.072 | 0.037 | 0.035 | 0.072 | 0.072 | 0.022 | 0.022 | 0.001 |
| $Na_2O$ | 0.060 | 0.060 | 0.074 | 0.074 | 0.088 | 0.088 | 0.060 | 0.060 | 0.060 |
| Cl | 0.055 | 0.055 | 0.047 | 0.047 | 0.094 | 0.093 | 0.023 | 0.023 | — |
| $SnO_2$ | 0.05 | 0.20 | 0.05 | 0.05 | 0.05 | 0.05 | 0.05 | 0.20 | — |
| $As_2O_3$ | 0.05 | 0.05 | 0.05 | 0.10 | 0.05 | 0.10 | 0.05 | 0.05 | — |
| $Sb_2O_3$ | 0.05 | 0.05 | 0.05 | 0.38 | 0.05 | 0.38 | 0.05 | 0.05 | — |
| Bubble count (bubbles/$cm^3$) | 81 | 75 | 53 | 32 | 39 | 39 | 25 | 24 | 159 |
| Relative ratio of bubble count* | 0.51 | 0.47 | 0.33 | 0.20 | 0.25 | 0.24 | 0.16 | 0.15 | 1 |
| Homogeneity | Good | Good | Good | Good | Good | Good | Good | Good | Poor |
| Overall evaluation | Good | Excellent | Excellent | Excellent | Excellent | Excellent | Excellent | Excellent | Poor |

*Comparison with Comparative Example 7

TABLE 5

| | Component (mass %) | | | | | | | |
|---|---|---|---|---|---|---|---|---|
| | Ex. 31 | Ex. 32 | Ex. 33 | Ex. 34 | Ex. 35 | Ex. 36 | Ex. 37 | Ex. 38 |
| $SiO_2$ | 60.2 | 60.3 | 60.3 | 60.3 | 60.3 | 60.3 | 60.3 | 59.9 |
| $B_2O_3$ | 8.0 | 8.0 | 8.0 | 8.0 | 8.0 | 8.0 | 8.0 | 8.0 |
| $Al_2O_3$ | 18.0 | 18.0 | 18.0 | 18.0 | 18.0 | 18.0 | 18.0 | 17.9 |
| MgO | 1.0 | 1.0 | 1.0 | 1.0 | 1.0 | 1.0 | 1.0 | 1.0 |
| CaO | 8.0 | 8.0 | 8.0 | 8.0 | 8.0 | 8.0 | 8.0 | 7.9 |
| SrO | 1.5 | 1.5 | 1.5 | 1.5 | 1.5 | 1.5 | 1.5 | 1.5 |
| BaO | 3.0 | 3.0 | 2.9 | 3.0 | 3.0 | 3.0 | 3.0 | 3.0 |
| $Li_2O$ | 0.034 | 0.034 | 0.034 | 0.034 | 0.034 | 0.034 | 0.034 | 0.065 |
| $K_2O$ | 0.036 | 0.036 | 0.036 | 0.036 | 0.036 | 0.036 | 0.036 | 0.071 |
| $Na_2O$ | 0.074 | 0.074 | 0.074 | 0.074 | 0.074 | 0.074 | 0.074 | 0.088 |
| Cl | 0.047 | 0.047 | 0.047 | 0.047 | 0.047 | 0.047 | 0.047 | 0.093 |
| $SnO_2$ | 0.10 | 0.10 | 0.10 | — | 0.10 | — | — | 0.10 |
| $As_2O_3$ | 0.05 | — | — | — | 0.05 | 0.05 | 0.05 | 0.10 |
| $Sb_2O_3$ | 0.05 | — | 0.05 | 0.05 | — | — | 0.05 | 0.38 |
| Bubble count (bubbles/$cm^3$) | 61 | 53 | 53 | 35 | 25 | 24 | 20 | 46 |
| Relative ratio of bubble count* | 0.59 | 0:52 | 0.52 | 0.35 | 0.25 | 0.23 | 0.19 | 0.45 |

TABLE 5-continued

| | | | | | | | | |
|---|---|---|---|---|---|---|---|---|
| Homogeneity | Good | Good | Good | Good | Good | Good | Good | Good |
| Overall evaluation | Good | Good | Good | Excellent | Excellent | Excellent | Excellent | Excellent |

| | Component (mass %) | | | | | | |
|---|---|---|---|---|---|---|---|
| | Ex. 39 | Ex. 40 | Ex. 41 | Ex. 42 | Ex. 43 | Ex. 44 | Comparative Example 8 |
| $SiO_2$ | 60.2 | 60.3 | 59.7 | 60.2 | 59.7 | 60.0 | 60.4 |
| $B_2O_3$ | 8.0 | 8.0 | 7.9 | 8.0 | 7.9 | 8.0 | 8.0 |
| $Al_2O_3$ | 18.0 | 18.0 | 17.8 | 18.0 | 17.8 | 17.9 | 18.0 |
| MgO | 1.0 | 1.0 | 1.0 | 1.0 | 1.0 | 1.0 | 1.0 |
| CaO | 7.9 | 8.0 | 7.9 | 8.0 | 7.9 | 7.9 | 8.0 |
| SrO | 1.5 | 1.5 | 1.5 | 1.5 | 1.5 | 1.5 | 1.5 |
| BaO | 3.0 | 3.0 | 3.0 | 3.0 | 2.9 | 3.0 | 3.0 |
| $Li_2O$ | 0.065 | 0.021 | 0.021 | 0.039 | 0.038 | 0.034 | 0.003 |
| $K_2O$ | 0.071 | 0.022 | 0.022 | 0.071 | 0.070 | 0.036 | 0.001 |
| $Na_2O$ | 0.088 | 0.060 | 0.060 | 0.060 | 0.060 | 0.074 | 0.060 |
| Cl | 0.093 | 0.023 | 0.023 | 0.055 | 0.055 | 0.046 | — |
| $SnO_2$ | 0.10 | 0.10 | 1.00 | 0.10 | 1.00 | 0.10 | — |
| $As_2O_3$ | 0.05 | 0.05 | 0.05 | 0.05 | 0.05 | 0.10 | — |
| $Sb_2O_3$ | 0.05 | 0.05 | 0.05 | 0.05 | 0.05 | 0.38 | — |
| Bubble count (bubbles/cm$^3$) | 10 | 45 | 4 | 15 | 12 | 0 | 102 |
| Relative ratio of bubble count* | 0.10 | 0.45 | 0.04 | 0.15 | 0.12 | 0 | 1 |
| Homogeneity | Good | Good | Good | Good | Good | Good | Poor |
| Overall evaluation | Excellent | Excellent | Excellent | Excellent | Excellent | Excellent | Poor |

*Comparison with Comparative Example 8

TABLE 6

| Component (mass %) | Ex. 45 | Ex. 46 | Ex. 47 | Ex. 48 | Ex. 49 | Ex. 50 | Ex. 51 |
|---|---|---|---|---|---|---|---|
| $SiO_2$ | 64.8 | 62.7 | 64.3 | 62.3 | 61.3 | 62.6 | 59.5 |
| $B_2O_3$ | 9.0 | 10.4 | 11.4 | 11.9 | 10.7 | 10.9 | 10.5 |
| $Al_2O_3$ | 16.5 | 12.9 | 10.5 | 15.1 | 16.0 | 11.0 | 15.0 |
| MgO | 1.7 | 4.0 | 4.8 | 2.0 | 1.3 | 4.0 | 0.5 |
| CaO | 5.6 | 4.0 | 5.5 | 2.9 | 5.5 | 4.0 | 4.7 |
| SrO | 1.8 | 5.4 | 2.5 | 3.7 | 2.6 | 6.4 | 3.1 |
| BaO | — | — | 0.4 | 1.5 | 2.0 | 0.5 | 6.2 |
| $Li_2O$ | 0.037 | 0.037 | 0.038 | 0.036 | 0.036 | 0.037 | 0.035 |
| $K_2O$ | 0.362 | 0.365 | 0.374 | 0.355 | 0.355 | 0.365 | 0.344 |
| $Na_2O$ | 0.092 | 0.092 | 0.093 | 0.091 | 0.091 | 0.092 | 0.090 |
| Cl | 0.156 | 0.158 | 0.161 | 0.153 | 0.153 | 0.157 | 0.148 |
| Bubble count (bubbles/cm$^3$) | 19 | 17 | 14 | 14 | 14 | 10 | 10 |
| Homogeneity | Good | Good | Good | Good | Good | Good | Good |
| Overall evaluation | Excellent | Excellent | Excellent | Excellent | Excellent | Excellent | Excellent |

| Component (mass %) | Ex. 52 | Ex. 53 | Ex. 54 | Ex. 55 | Ex. 56 | Ex. 57 | Ex. 58 |
|---|---|---|---|---|---|---|---|
| $SiO_2$ | 60.6 | 59.7 | 60.1 | 59.8 | 56.7 | 47.8 | 42.0 |
| $B_2O_3$ | 10.9 | 9.4 | 8.0 | 6.9 | 9.9 | 7.0 | 17.3 |
| $Al_2O_3$ | 13.7 | 17.4 | 17.9 | 12.9 | 12.0 | 20.8 | 12.1 |
| MgO | 4.5 | 2.5 | 1.0 | 8.0 | 4.0 | 3.0 | 4.8 |
| CaO | 5.5 | 7.4 | 7.9 | 3.0 | 8.0 | 3.0 | 14.2 |
| SrO | 4.2 | 3.0 | 1.5 | 8.9 | 7.9 | 15.0 | — |
| BaO | — | — | 3.0 | — | 0.9 | 3.0 | 9.1 |
| $Li_2O$ | 0.037 | 0.037 | 0.036 | 0.038 | 0.037 | 0.036 | 0.036 |
| $K_2O$ | 0.367 | 0.361 | 0.353 | 0.369 | 0.362 | 0.329 | 0.352 |
| $Na_2O$ | 0.092 | 0.092 | 0.091 | 0.093 | 0.092 | 0.088 | 0.091 |
| Cl | 0.158 | 0.155 | 0.152 | 0.159 | 0.156 | 0.142 | 0.152 |
| Bubble count (bubbles/cm$^3$) | 7 | 3 | 0 | 0 | 0 | 0 | 0 |
| Homogeneity | Good | Good | Good | Good | Good | Good | Good |
| Overall evaluation | Excellent | Excellent | Excellent | Excellent | Excellent | Excellent | Excellent |

TABLE 7

| | Component (mass %) | | |
|---|---|---|---|
| | Comparative Example 9 | Comparative Example 10 | Comparative Example 11 |
| $SiO_2$ | 54.7 | 49.8 | 71.4 |
| $B_2O_3$ | 9.9 | 23.9 | 4.0 |
| $Al_2O_3$ | 14.9 | 9.0 | 10.9 |
| MgO | 14.9 | 5.0 | 3.9 |
| CaO | 4.9 | 4.0 | 3.0 |
| SrO | — | 3.9 | 3.1 |
| BaO | — | 4.0 | 3.1 |
| $Li_2O$ | 0.040 | 0.037 | 0.037 |
| $K_2O$ | 0.393 | 0.359 | 0.368 |
| $Na_2O$ | 0.095 | 0.092 | 0.092 |
| Cl | 0.169 | 0.155 | 0.158 |
| Bubble count (bubbles/cm$^3$) | — | — | 450 |
| Overall evaluation | Poor | Poor | Poor |

INDUSTRIAL APPLICABILITY

The present invention provides glass compositions that are applicable to uses requiring chemical resistance, heat resistance, and a small thermal expansion coefficient.

The invention claimed is:

1. A glass composition which comprises, in mass %,
40 to 70% $SiO_2$,
5 to 20% $B_2O_3$,
10 to 25% $Al_2O_3$,
1 to 10% MgO,
0 to 20% CaO,
0 to 20% SrO,
0 to 10% BaO,
0.001 to 0.5% $Li_2O$,
0.01 to 0.5% $Na_2O$,
greater than 0.03% and no greater than 0.5% $K_2O$, and
greater than 0% and no greater than 1.0% Cl,
wherein a total content of $Li_2O$, $Na_2O$, and $K_2O$ is in a range of greater than 0.07 mass % and no greater than 1.5 mass %.

2. The glass composition according to claim 1, wherein the $Li_2O$ content is in a range of greater than 0.02 mass % to 0.5 mass %.

3. The glass composition according to claim 1, wherein the $Na_2O$ content is in a range of greater than 0.05 mass % to 0.5 mass %.

4. The glass composition according to claim 1, wherein the Cl content is 0.04 mass % or greater and no greater than 1.0 mass %.

5. The glass composition according to claim 4, wherein the Cl content is in a range of greater than 0.09 mass % and no greater than 1.0 mass %.

6. The glass composition according to claim 1, which is essentially free of oxides of As and oxides of Sb.

7. The glass composition according to claim 1, which further comprises an oxide of As and/or an oxide of Sb.

8. The glass composition according to claim 7, wherein the oxide of As is contained in an amount of greater than 0 mass % and no greater than 0.1 mass % in terms of $As_2O$.

9. The glass composition according to claim 7, wherein the oxide of Sb is contained in an amount of greater than 0 mass % and less than 0.4 mass % in terms of $Sb_2O_3$.

10. The glass composition according to claim 7, wherein the oxide of Sb is contained in an amount of greater than 1.0 mass % in terms of $Sb_2O_3$.

11. The glass composition according to claim 7, which further comprises $SnO_2$ in the amount of greater than 0 mass % and no greater than 3 mass %.

12. The glass composition according to claim 1, which comprises 58 to 70 mass % $SiO_2$, 8 to 13 mass % $B_2O_3$, 13 to 20 mass % $Al_2O_3$, 1 to 5 mass % MgO, 1 to 10 mass % CaO, 0 to 4 mass % SrO, and 0 to 1 mass % BaO.

13. The glass composition according to claim 1, which comprises 57 to 65 mass % $SiO_2$, 5 to 12 mass % $B_2O_3$, 10 to 20 mass % $Al_2O_3$, 5 to 10 mass % MgO, 0 to 10 mass % CaO, and 0 to 10 mass % SrO.

14. The glass composition according to claim 1, which comprises 60 to 65 mass % $SiO_2$, 5 to 12 mass % $B_2O_3$, 10 to 20 mass % $Al_2O_3$, 1 to 5 mass % MgO, 1 to 6 mass % CaO, 0 to 10 mass % SrO, and 0 to 1 mass % BaO.

15. The glass composition according to claim 1, which comprises 56 to 65 mass % $SiO_2$, 5 to 12 mass % $B_2O_3$, 10 to 18 mass% $Al_2O_3$, 1 to 5 mass % MgO, 1 to 10 mass % CaO, 1 to 10 mass % SrO, and 0 to 1 mass % BaO.

16. The glass composition according to claim 1, which comprises 56 to 60 mass % $SiO_2$, 5 to 12 mass % $B_2O_3$, 10 to 18 mass % $Al_2O_3$, 1 to 5 mass % MgO, 1 to 6 mass % CaO, 1 to 6 mass % SrO, and 3 to 10 mass % BaO.

17. A glass substrate for information display devices, which consists of the glass composition of claim 1.

18. An information display device comprising the glass substrate for information display devices of claim 17.

19. The glass composition according to claim 1, which comprises 1 to 6 mass % of CaO.

* * * * *

UNITED STATES PATENT AND TRADEMARK OFFICE
CERTIFICATE OF CORRECTION

| | | |
|---|---|---|
| PATENT NO. | : 7,960,301 B2 | Page 1 of 1 |
| APPLICATION NO. | : 11/990354 | |
| DATED | : June 14, 2011 | |
| INVENTOR(S) | : Niida et al. | |

It is certified that error appears in the above-identified patent and that said Letters Patent is hereby corrected as shown below:

Column 16, line 10 (Claim 8): "$As_2O$" should read -- $As_2O_3$ --.

Signed and Sealed this
Tenth Day of January, 2012

David J. Kappos
*Director of the United States Patent and Trademark Office*